United States Patent
Vaslin et al.

(10) Patent No.: US 6,596,337 B1
(45) Date of Patent: Jul. 22, 2003

(54) FOOD COMPOSITION IN THE FORM OF A DRY EMULSION, PREPARATION METHOD AND USE THEREOF

(75) Inventors: Sophie Vaslin, Saint-Cloud (FR); Giles Guerin, Eaubonne (FR); Mikel Morvan, Asnieres (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/601,416

(22) PCT Filed: Dec. 9, 1998

(86) PCT No.: PCT/FR98/02670
§ 371 (c)(1),
(2), (4) Date: Sep. 25, 2000

(87) PCT Pub. No.: WO99/38387
PCT Pub. Date: Aug. 5, 1999

(30) Foreign Application Priority Data

Feb. 2, 1998 (FR) .............................................. 98 01161

(51) Int. Cl.[7] .............................. A23L 1/24; A23L 1/40; A23J 3/14; A23J 3/16
(52) U.S. Cl. ......................... 426/589; 426/98; 426/602; 426/607; 426/608; 426/654; 252/363.5; 514/952
(58) Field of Search ................................ 426/589, 602, 426/607, 608, 654, 98; 252/363.5; 514/952

(56) References Cited

U.S. PATENT DOCUMENTS

| | | | |
|---|---|---|---|
| 4,492,714 A | * 1/1985 | Cooper et al. ................. | 426/62 |
| 5,472,706 A | * 12/1995 | Friedman et al. ............ | 424/450 |
| 5,750,142 A | * 5/1998 | Friedman et al. ............ | 424/450 |
| 6,036,887 A | * 3/2000 | Guerin ..................... | 252/363.5 |
| 6,299,798 B1 | * 10/2001 | Guerin et al. ............. | 252/363.5 |

FOREIGN PATENT DOCUMENTS

WO    WO 99-383387    * 8/1999

* cited by examiner

Primary Examiner—Nina Bhat

(57) ABSTRACT

The invention concerns a dry emulsion characterised in that it is obtained by drying a dispersion of at least a weakly soluble edible substance also called active substance (MA) in a continuous phase comprising: at least an emulsifier (E) containing at least a partially hydrolysed vegetable protein (protein lysate) whereof the degree of hydrolysis ranges between 0 (excluded) and less than 5%; and at least a water soluble or water dispersible interstitial filler (ARI) containing at least a partially hydrolysed vegetable protein (protein lysate) whereof the degree of hydrolysis ranges between 5 and 40%. The invention also concerns a method for preparing said emulsions, comprising the following steps: (i) a first step consists in preparing a dispersion in water or in an aqueous phase comprising at least a hydrophobic active substance (MA), at least an emulsifier (E), and at least a filler (ARI); (ii) the second step consists in drying said dispersion until a dry emulsion is formed. The invention further concerns the use of said dry emulsions for making food compositions.

21 Claims, No Drawings

FOOD COMPOSITION IN THE FORM OF A DRY EMULSION, PREPARATION METHOD AND USE THEREOF

This application is an application under 35 U.S.C. Section 371 of International Application Number PCT/FR98/02670 filed on Dec. 9, 1998.

The subject of the present invention is a dry emulsion, the method for its preparation and its use for the manufacture of compositions for dietary use.

It relates more particularly to dry emulsions, advantageously in the form of granules, dispersible in water in the form of an oil-in-water emulsion and comprising at least one sparingly water-soluble edible substance also called an active substance (AS).

In the context of the present invention, the active substances (AS) may in particular and especially be in liquid form. They may also be solids. As regards some hydrophobic solid active substances, there may be problems of handling difficulties due to the dispersion of the said active substances, or of sensitivity towards the surrounding medium.

It should be recalled that a suspension is a dispersion of a solid in a liquid, and that an emulsion is a dispersion of a liquid in another liquid, the liquids being immiscible. In the remainder of the text, the term "dispersion" will be used to designate both an emulsion and a suspension.

In some sectors, and more particularly in the food sector, there is a need to use and therefore to prepare formulations comprising active substances which are sparingly soluble in water and in general hydrophobic. One of the possibilities of formulation is to prepare dispersions in which the continuous phase is aqueous and the dispersed phase is an oil (oil-in-water emulsion).

However, problems linked to physical and even chemical stability during the preservation of these emulsions generally exist. Indeed, on the one hand, it is common to observe a more or less extensive phase separation of the constituents of the emulsion and, on the other hand, there may be problems of loss of the properties of the active substance, it being possible for the active substance to become degraded under the influence of water, for example, by hydrolysis, by catalysis and the like.

Finally, it is known that in order to be easy to handle and pump, conventional oil-in-water emulsions have relatively low contents of active substance and a large quantity of water, hence the economic problem due to the transport of this high quantity of water, and of bacterial contamination thereof.

In addition, emulsifiers generally known to give the emulsions targeted above are in particular based on animal products whose sector is subject to caution.

Moreover, it has been proposed to convert oil-in-water emulsions by drying using conventional techniques such as for example freeze-drying or spray-drying. However, the resulting dried emulsions contain a low content of active substance.

Furthermore, the drying of an emulsion is not without drawbacks. Indeed, after drying, it is essential that the dry emulsions can become completely or almost completely redispersed in the presence of a liquid medium.

Moreover, substitutes exist on the food market for the major emulsified sauces in particular of French cuisine such as sauces of the vinaigrette type, mayonnaise type or béarnaise type, and the like, or based on roux in particular, blond roux, brown roux, béchamel, sauce suprême, and the like.

These substitute sauces have many drawbacks. Among these drawbacks, there may be mentioned not only those which the housewife accepts because of speed of use such as the lack of taste, of flavour, of subtleness, and even of texture of the sauces, but also those caused by their ready-made emulsion form, in particular the need for large quantities of water, which increases the weight thereof and increases the chemical fragility, and the use of chemical and physical stabilizers in a large quantity.

Among other problems which may be mentioned, the dispersion of fats in various cooking appliances, in particular the dispersion of butter or of animal or vegetable fat in various dough pieces to give raised doughs such as brioches, "miques", "pompes", "fougasses" and the like.

One of the aims of the present invention is to provide a novel dry emulsion, completely or almost completely redispersible in an aqueous medium, and containing high concentrations of sparingly water-soluble active substance, in particular in the form of a hydrophobic liquid.

Another aim of the invention is to provide a dry emulsion of the above type based on vegetable proteins, the animal sector being subject to caution.

Another aim of the present invention is to provide a composition for dietary use, of the emulsified sauce (hot or cold) or fatty phase type, obtained from a dry emulsion of the above type.

These aims and others which will subsequently appear are achieved by means of a dry emulsion characterized in that it is obtained by drying a dispersion of at least one sparingly water-soluble edible substance also called active substance (AS), in a continuous phase comprising:

at least one emulsifier (E) containing at least one partially hydrolysed vegetable protein (protein lysate) whose degree of hydrolysis is between 0 excluded and less than 5%, and at least one water-soluble or water-dispersible interstitial filler (IF) containing at least one partially hydrolysed vegetable protein (protein lysate) whose degree of hydrolysis is between 5 and 40%.

The subject of the invention is likewise a method of preparing such emulsions, comprising the following steps:

i) the first step consists in preparing a dispersion in water or in an aqueous phase comprising at least one hydrophobic active substance (AS), at least one emulsifier (E) and at least one filler (IF);

ii) the second step consists in drying the said dispersion until a dry emulsion is formed.

It also relates to the use of the dry emulsions of the above type for the manufacture of compositions for dietary use.

"Dry emulsion" is understood to mean a powder which, when brought into contact with an aqueous phase, gives or again gives an emulsion in which the particle size is close to that of the emulsion before drying.

The degree of hydrolysis of a protein is defined by the percentage of peptide bonds cleaved. The degree of hydrolysis can be determined either by using compounds which react specifically with amino groups involved in peptide bonds, or by directly titrating the said amino groups.

In general, the vegetable protein lysates according to the invention can be obtained by chemical or enzymatic hydrolysis of the protein.

The hydrolysis conditions, whether chemical or enzymatic, are well known to persons skilled in the art. Depending on the desired degree of hydrolysis, persons skilled in the art will know how to adjust the operating conditions for optimal hydrolysis. The hydrolysis conditions are in particular those described in Enzymic Hydrolysis of Food Proteins, Alder-Nissen, 1986, Elsevier Applied Science Publisher, London.

According to the present invention, to produce the emulsion, it is desirable that the continuous phase comprises at least one emulsifier (E) containing at least one partially hydrolysed vegetable protein, or more exactly vegetable protein lysate.

The emulsifier (E) is more particularly a partially hydrolysed vegetable protein whose degree of hydrolysis is between 0 excluded and less than 5%.

According to a particularly advantageous embodiment of the present invention, in the emulsifier (E), the lysates comprise as protein fragment, by mass, at least half, advantageously ⅔, preferably ¾ of protein fragments, at least 10, preferably at least 15 amino acids.

It is also highly desirable and financially advantageous that in the emulsifier (E), the lysates comprise as protein fragment, by mass, at least half, advantageously ⅔, preferably ¾ of protein fragments of at most about 200 amino acids, advantageously at most about 100 amino acids.

Still more preferably, these lysates comprise as protein fragment, by mass, at least half, advantageously ⅔, preferably ¾ of protein fragments comprising between 10 and 100 amino acids, advantageously between 15 and about 70 amino acids.

In the context of the present invention, the emulsifier (E) may contain one or a mixture of partially hydrolysed vegetable proteins, as mentioned above.

In addition to the protein lysate as specified above, the emulsifier (E) may contain [lacuna], other agents known per se for their emulsifying action may be used.

In the present description, the term emulsifier also covers the term dispersant for the cases where the active substance is a solid.

For good implementation of the invention, in the continuous phase, the emulsifier (E) is present in a quantity of less than 10%, and preferably of between 1 and 3%, expressed as a percentage by mass relative to the active substance.

In the context of the present invention, the continuous phase comprises, in addition, one water-soluble or water-dispersible interstitial filler (IF) which may be chosen from partially hydrolysed vegetable proteins (protein lysate).

The interstitial filler (IF) is more particularly a partially hydrolysed vegetable protein whose degree of hydrolysis is between 5 and 40%.

This interstitial agent (IF) should exhibit a water-solubility, expressed as mass of solute over solvent mass, at least equal to 1%.

It is very highly desirable that the interstitial filler (IF) contains a high proportion of compounds having functions capable of giving so-called "hydrogen" bonds (acid, amide, amine, alcohol or thiol function and the like).

It is also very highly desirable that the said interstitial filler (IF) does not exhibit a risk of crystallization under the operating conditions and in particular in the presence of the emulsifier.

In the continuous phase, the interstitial filler (IF) is present in a quantity of at least 10% and of at most 80%, expressed as a percentage by mass relative to the total dry matter.

More particularly, the interstitial filler (IF) is present in a quantity of between 20% and 60%, expressed as a percentage by mass relative to the total dry matter.

The interstitial filler (IF) is obtained from a more extensive lysis of vegetable proteins, in particular to give protein fragments of which at least ⅔ by mass have at most about 50 amino acids, preferably at most 20 amino acids.

Among the proteins of plant origin which can lead, after a lysis which is extensive to a greater or lesser degree depending on the case, respectively to the interstitial agent (IF) and to the emulsifier (E), there may be mentioned, as a guide, the proteins obtained from high-protein seeds, in particular those from peas, field beans, lupins, haricot beans and lentils; the proteins obtained from cereal grains, in particular those from wheat, barley, rye, maize, rice, oats and millet; the proteins obtained from oil-bearing seeds, in particular those from soya bean, groundnut, sunflower, rapeseed, mustard and coconut (copra); the proteins obtained from leaves, in particular of lucerne and of nettles; and the proteins obtained from underground plant storage organs, in particular those from potato and from beet.

Preferably, the said lysate is a protein hydrolysate obtained from soya bean or from wheat.

The interstitial filler (IF) may contain one or a mixture of protein lysates corresponding to the abovementioned criteria.

In addition to the said lysates, the agent (IF) may contain sugars and/or oligomers of the latter. In this regard, there may be mentioned for example polyols and in particular sugars and hydroxy acids.

According to one variant embodiment of the invention, the interstitial filler (IF) comprises at least one "saccharide-"fraction chosen from monosaccharides, glycosides or polysaccharides which are water-soluble or water-dispersible, and mixtures thereof, this being advantageously up to 50%, preferably up to 20% of the mass of the sum of the interstitial filler (IF) and of the emulsifier (E).

Among the monosaccharides, there may be mentioned the aldoses such as glucose, mannose, galactose, ribose, and the ketoses such as fructose.

The glycosides are compounds which result from the condensation, with elimination of water, of molecules of monosaccharides with each other or alternatively of molecules of monosaccharides with noncarbohydrate molecules. Among the glycosides, there are preferred the saccharides which are formed by the joining of exclusively carbohydrate units and more particularly the oligosaccharides which contain only a limited number of these units, that is to say a number which is in general less than or equal to 10. By way of examples of oligosaccharides, there may be mentioned sucrose, lactose, cellobiose, maltose and trehalose preferably having a melting point greater than 100° C. and a solubility in water of between 50 and 500 g/l.

The highly depolymerized polysaccharides which are suitable are described for example in the book by P. ARNAUD entitled "cours de chimie organique", Gaultier-Villars publishers, 1987. More particularly, these polysaccharides have a weight-average molecular mass of less than 5000 g/mol.

By way of nonlimiting example of highly depolymerized polysaccharides, there may be mentioned dextran, starch, xanthan gum and galactomannans such as guar or carob.

As mentioned above, the dry emulsion according to the invention is obtained by drying a dispersion of at least one sparingly water-soluble edible substance, also called active substance (AS), in a continuous phase.

All the active substances (AS), whether they are solid or liquid (as they are or in solution in a solvent) are suitable for the invention in so far as they are only slightly miscible, advantageously very slightly, preferably immiscible with water.

"Slightly miscible" is understood to mean active substances whose solubility in water at pH 7 and under normal conditions does not exceed 10% by mass.

"Very slightly miscible" is understood to mean active substances whose solubility in water at pH 7 and under normal conditions does not exceed 5 by mass.

"Immiscible" is understood to mean active substances whose solubility in water at pH 7 and under normal conditions does not exceed 1% by mass.

Preferably, the said hydrophobic active substance (AS) has a melting point of less than about 100° C.; most particularly, it is liquid at room temperature.

In the text which follows, "active substance (AS)" will be understood to mean either the pure active substance (which may itself be a solvent), or the active substance solubilized in a solvent (which is of course acceptable for food compounds, for example oils).

By way of nonlimiting examples, the active substances (AS) used in the food sector may be chosen from mono-, di- and triglycerides, essential oils, colourings, food flavourings, oleoresins, extracts, edible oils such as sunflower oil, soya bean oil or grapeseed oil.

When the active substance (AS) is a solvent (or a mixture of solvents) or a solution in a solvent (or several solvents), the said solvent is not or is only sparingly miscible with water in the sense indicated above. By way of examples, there may be mentioned terpenic compounds such as D-limonene or alternatively L-limonene, certain aliphatic esters such as methyl or ethyl, in particular succinic and glutaric, esters, paraffin oils such as liquid paraffin, and synthetic or natural triglycerides.

It is desirable that the mass ratio, on a dry basis, between the active substance (AS) and the sum of the active substance (AS), the interstitial filler (IF) and the emulsifier (E) is at least equal to about 0.2, advantageously at least equal to 0.6. This mass ratio is at most equal to 0.9.

Another subject of the invention consists of a method of preparing, in two steps, dry emulsions, comprising the following steps:

i) the first step consists in preparing a dispersion in water or in an aqueous phase comprising at least one hydrophobic active substance (AS), at least one emulsifier (E) and at least one filler (IF);

ii) the second step consists in drying the said dispersion until a dry emulsion is formed.

The dispersion prepared in step (i) has the following particle size:

$d_{80}$, advantageously $d_{90}$, is at most equal to about 50 μm (micrometer), advantageously to about 30 μm, preferably to 10 μm;

$d_{20}$, advantageously $d_{10}$, is at least equal to about 0.1 μm, advantageously to 0.5 μm, preferably to 1 μm (micrometer).

For drying the dispersion (step ii), it is possible in particular to use spray-drying or, for fragile substances, freeze-drying.

When the active substance (AS) has a melting point of less than 100° C. or alternatively exists in liquid form at room temperature, it is possible to use, at the appropriate temperature, any of the methods of preparing emulsions known to persons skilled in the art and which are described in "ENCYCLOPEDIA of EMULSIONS TECHNOLOGY", Volumes 1 to 3 by Paul BECHER published by MARCEL DEKKER INC., 1983.

Thus, the so-called direct phase emulsification method is more particularly suitable for the preparation of the dry emulsions according to the invention. It is briefly recalled that this method consists in preparing a mixture containing the water or the aqueous phase, the emulsifier (E) and the interstitial agent (IF), and then in introducing the active substance (AS) in liquid form, with stirring.

It is also possible to prepare the emulsion using colloid mills such as MENTON GAULIN and MICROFLUIDIZER (MICROFLUIDICS).

The emulsification may be performed at a temperature in the region of room temperature, that is to say in the region of 20° C., although lower or even higher temperatures (case of products whose melting point is greater than 20° C.) can be envisaged.

The second step of the method of preparation according to the invention consists in drying the emulsion formulated in (i) in order to obtain dry emulsions.

The dry emulsion thus obtained is advantageously provided in the form of granules, which granules have a particle size such that:

$d_{80}$, advantageously $d_{90}$, is at most equal to 500 μm (micrometers), advantageously to 200 μm, preferably 150 μm;

$d_{20}$, advantageously $d_{10}$, is at least equal to 5 μm (micrometers), advantageously to 10 μm, preferably to 20 μm.

The method used to remove the water from the emulsion and to advantageously obtain granules may be performed by any means known to persons skilled in the art.

Freeze-drying, which corresponds to a freezing step, followed by a sublimation step, or alternatively spray-drying, or else drying over a cylinder are for example suitable.

The water-soluble or water-dispersible proteins of plant origin are particularly well suited to spray-drying because they are particularly stable.

The spray-drying may be carried out in the usual manner in any known apparatus, for example a spray-drying tower combining spraying performed by a nozzle or a turbine with a hot-gas stream.

The hot gas (in general air) inlet temperature at the top of the column is preferably between 100 and 115° C. and the outlet temperature is preferably between 55 and 65° C.

The abovementioned drying methods, and more particularly spray-drying, are particularly suitable because they make it possible to preserve the particle size distribution of the emulsion in its original state during drying and to advantageously obtain granules.

In the present description, the particle size characteristics refer to notations of the type $d_n$ where n is a number from 1 to 99. This notation means that n% by volume of the particles has a size less than or equal to the said size.

The dry emulsions obtained are easily redispersible in water or an aqueous phase to again give an emulsion having a particle size in the region of that of the initial emulsion.

The dry emulsions according to the invention, advantageously in the form of granules, have many advantages and many applications.

First of all, when the active substance (AS) is liquid, this forming makes it possible to avoid any problems due to the use of emulsions. Thus, the problems of storage instability such as in particular creaming, flocculation, ripening and coalescence are avoided. These various phenomena are described in "ENCYCLOPEDIA of EMULSIONS TECHNOLOGY", Volume 1 by Paul BECHER, published by MARCEL DEKKER INC., 1983.

Another advantage of the present invention is that the concentrations of, in particular liquid, active substances (AS) can be very high compared with conventionally known emulsions while remaining easy to handle. Consequently, during the use of these dry emulsions advantageously in the form of granules, a smaller quantity of granules will be sufficient.

Moreover, the forming according to the invention makes it possible to protect the said liquid or solid active substance (AS) when it is fragile (sensitivity to hydrolysis, volatility and the like).

These dry emulsions are in addition very easily mixed with powders, this being in a sufficiently homogeneous manner before the addition of the aqueous phase. This makes it possible in particular to make mixtures of powders with (nonexhaustive list):

flours;

yeasts, in particular freeze-dried;

leavening powders (carbonates);

flavour modifiers (solids), including salt and pepper, glutamates;

sugar;

texturing agent powders;

solid buffers (pH);

salts, in particular trace element(s);

water-soluble vitamins such as ascorbates and ascorbic acid;

solid acids such as citric acid;

aromatic herbs;

with another dry emulsion whose content should only be mixed at the last moment.

The dry emulsions according to the invention, upon contact with water or with an aqueous phase easily again gives a dispersion which makes it possible to produce preparations in particular for emulsified sauces and with a fatty phase.

The subject of the invention is also the use of the dry emulsions mentioned above, for the manufacture of compositions for dietary use.

Thus, the present invention can provide a dry emulsion which allows, upon addition of water or of an aqueous phase, the manufacture of a composition for dietary use such as sauces of the "vinaigrette type", "mayonnaise type", "gribiche type" or "roux type".

Furthermore, the present invention can provide a dry emulsion which allows, upon addition of water or of an aqueous phase and upon heating, the production of a hot composition for dietary use such as sauces of the "béarnaise type", "choron type", "maltaise type", "hollandaise type", "beurre blanc type" or "beurre rouge type".

The simple mixing of a dry emulsion with an aqueous phase (water, various vinegars, lemon juice, verjus, with optional ingredients) optionally with heating, leads to a composition which is sufficiently stable, even without special precaution, for the duration of the service.

Furthermore, the use of vegetable protein lysates has proved particularly satisfactory for making hot emulsified sauces.

Moreover, the fat-soluble flavourings entering into the composition of the sauces are advantageously in the form of one, or more, dry emulsion(s) or dissolved in the dry emulsion.

Thus, the present invention is to provide a dry emulsion which allows, upon addition of water or of an aqueous phase and of a flour when it does not contain any, the manufacture of a composition for dietary use of the brioche type or fougasse type (with oil) fatty phase type.

Premixes of dry emulsion of fatty substance with various flours make it possible to produce preparations for béchamel.

Premixes of various flours with freeze-dried yeasts and dry emulsions make it possible to prepare items of the brioche, blini and pancake type.

The following examples are given by way of illustration and with no limitation being implied.

EXAMPLES

Example 1

Production of an Emulsion of Orange Essential Oil in an Aqueous Solution of Soya Bean Protein A mixture having the following composition is prepared:

| | |
|---|---|
| FP940 (soya bean protein hydrolysate having a degree of hydrolysis of less than 5%, from Protein Technologies International) | 0.6 part by weight |
| Orange essential oil (Givaudan-Roure) | 30 parts by weight |
| Deionized water | 69.4 parts by weight | by adding essential oil to an aqueous solution containing 5W by weight of FP940.

The dry matter level is 30.6%.

The mixture is first preemulsified with the aid of an Ultra Turrax T25 apparatus for 1 minute at 9500 rpm.

The emulsion proper is produced by means of a microfluidizer (M110T from Microfluidics) under the following conditions:

pressure: 500 bar, 3 rounds in the microfluidizer, cold water bath at the outlet of the microfluidizer.

The emulsion obtained has a narrow particle size distribution with a $d_{50}$ of 1.8 μm.

Incorporation of the Matrix (Interstitial Filler)

6.9 g of a 15% hydrolysed vegetable protein (FP900 from Protein Technologies International) are incorporated into the emulsion prepared, as matrix or interstitial filler.

This formulated emulsion has 35.1% of dry matter and a $d_{50}$ of 1.8 μm.

The composition of this emulsion corresponds to an A/B weight ratio, on a dry basis, of 60/20, in which ratio A and B have the following meanings:

$A$=essential oil/% total dry matter×100

$B$=proteins FP900+FP940/% total dry matter×100

Drying of the Formulated Emulsion

This emulsion is then freeze-dried. The granules derived from this treatment have the following composition:

| | |
|---|---|
| FP940 (soya bean protein hydrolysate having a degree of hydrolysis of less than 5%, from Protein Technologies International) (emulsifier) | 1.6 parts by weight |
| Essential oil | 80 parts by weight |
| FP900 (soya bean protein hydrolysate having a degree of hydrolysis of 15%, from Protein Technologies International) (interstitial filler or matrix) | 18.4 parts by weight |

The redispersion of the granules in water again gives an essential oil emulsion having a fairly homogeneous particle size distribution and a median diameter ($d_{50}$) of 5 μm.

Example 2

Production of an Emulsion of Orange Essential Oil in an Aqueous Solution of Soya Bean Protein and Sucrose A mixture having the following composition is prepared:

| | |
|---|---|
| FP940 (soya bean protein hydrolysate having a degree of hydrolysis of less than 5%, from Protein Technologies International) | 0.4 part by weight |
| Orange essential oil (Givaudan-Roure) | 20 parts by weight |
| Deionized water | 79.6 parts by weight | by adding essential oil to an aqueous solution containing 5% by weight of FP940.

The dry matter level is 20.4%.

The mixture is first preemulsified with the aid of an Ultra Turrax T25 for 1 minute at 9500 rpm.

The emulsion proper is produced by means of a microfluidizer (M110T from Microfluidics) under the following conditions:

pressure: 500 bar, 3 rounds in the microfluidizer, cold water bath at the outlet of the microfluidizer.

The emulsion obtained has a narrow particle size distribution with a $d_{50}$ of 2 µm.

Incorporation of the Matrix (Interstitial Filler)

2.3 g of a 15% hydrolysed vegetable protein (FP900 from Protein Technologies International) and 2.3 g of sucrose are incorporated into the emulsion prepared, as matrix or interstitial filler.

This formulated emulsion has 23.9% of dry matter and a $d_{50}$ of 2 µm.

The composition of this emulsion corresponds to an A/B weight ratio, on a dry basis, of 60/40, in which ratio A and B have the following meanings:

$A$=essential oil/% total dry matter×100

$B$=proteins FP900+FP 940+sucrose/% total dry matter×100

Drying of the Formulated Emulsion

This emulsion is then freeze-dried. The microcapsules or granules derived from this treatment have the following composition:

| | |
|---|---|
| FP940 (soya bean protein hydrolysate having a degree of hydrolysis of less than 5%, from Protein Technologies International) (emulsifier) | 1.6 parts by weight |
| Essential oil | 80 parts by weight |
| FP900 (soya bean protein hydrolysate having a degree of hydrolysis of 15%, from Protein Technologies International) + sucrose (interstitial filler or matrix) | 9.2 parts by weight |

The redispersion of the microcapsules or granules in water again gives an essential oil emulsion having a fairly homogeneous particle size distribution (a $d_{50}$ of 5 µm)

Example 3

Production of a Soya Bean Oil Emulsion in an Aqueous Solution of Soya Bean Protein A mixture having the following composition is prepared:

| | |
|---|---|
| FP940 (soya bean protein hydrolysate having a degree of hydrolysis of less than 5%, from Protein Technologies International) | 0.6 part by weight |
| Soya bean oil | 30 parts by weight |
| Deionized water | 69.4 parts by weight | by adding essential oil to an aqueous solution containing 5% by weight of FP940.

The dry matter level is 30.6%.

The mixture is first preemulsified with the aid of an Ultra Turrax T25 apparatus for 1 minute at 9500 rpm.

The emulsion proper is produced by means of a microfluidizer (M110T from Microfluidics) under the following conditions:

pressure: 500 bar, 3 rounds in the microfluidizer, cold water bath at the outlet of the microfluidizer.

The emulsion obtained has a narrow particle size distribution with a $d_{50}$ of 5 µm,

Incorporation of the Matrix (Interstitial Filler)

12.9 g of a 15% hydrolysed vegetable protein (FP900 from Protein Technologies International) are incorporated into the emulsion prepared, as matrix or interstitial filler.

This formulated emulsion has 38.5% of dry matter and a $d_{50}$ of 5 µm.

The composition of this emulsion corresponds to an A/B weight ratio, on a dry basis, of 60/40, in which ratio A and B have the following meanings:

$A$=essential oil/% total dry matter×100

$B$=proteins FP900+FP 940/% total dry matter×100

Drying of the Formulated Emulsion

This emulsion is then freeze-dried. The granules derived from this treatment have the following composition:

| | |
|---|---|
| FP940 (soya bean protein hydrolysate having a degree of hydrolysis of less than 5%, from Protein Technologies International) (emulsifier) | 3.2 parts by weight |
| Essential oil | 60 parts by weight |
| FP900 (soya bean protein hydrolysate having a degree of hydrolysis of 15%, from Protein Technologies International) (filler or matrix) | 36.8 parts by weight |

The redispersion of the granules in water again gives an essential oil emulsion having a fairly homogeneous particle size distribution (a $d_{50}$ of 10 µm).

What is claimed is:

1. A dry emulsion obtained by drying a dispersion of at least one sparingly water-soluble edible active substance (AS), in a continuous phase comprising:

at least one emulsifier (E) containing at least one partially hydrolysed vegetable protein (protein lysate) whose degree of hydrolysis is between 0 excluded and less than 5%, and at least one water-soluble or water-dispersible interstitial filler (IF) containing at least one partially hydrolysed vegetable protein (protein lysate) whose degree of hydrolysis is between 5 and 40%.

2. A dry emulsion according to claim 1, wherein in the emulsifier (E), the lysate comprises as protein fragment, by mass, at least half of protein fragments having at least 10 amino acids.

3. A dry emulsion according to claim 2, wherein the lysate comprises at least ¾ of protein fragments having at least 15 amino acids.

4. A dry emulsion according to claim 2, wherein the lysate comprises at least ⅔ of protein fragments of at most about 200 amino acids.

5. A dry emulsion according to claim 2, wherein the lysate comprises at least ¾ of protein fragments of at most about 100 amino acids.

6. A dry emulsion according to claim 1, wherein in the emulsifier (E), the lysate comprises ¾ of protein fragments comprising between 15 and 70 amino acids.

7. A dry emulsion according to claim 1, wherein in the continuous phase, the emulsifier (E) is present in a quantity of less than 10%, expressed as a percentage by mass relative to the active substance.

8. A dry emulsion according to claim 7, wherein the emulsifier (E) is present in a quantity of between 1 and 3%.

9. A dry emulsion according to claim 1, wherein the interstitial filler (IF) exhibits a water-solubility, expressed as mass of solute over solvent mass, at least equal to 1%.

10. A dry emulsion according to claim 1, wherein in the continuous phase, the interstitial filler (IF) is present in a quantity of at least 10% and of at most 80%, expressed as a percentage by mass relative to the total dry matter.

11. A dry emulsion according to claim 10, wherein the interstitial filler (IF) is present in a quantity of between 20% and 60%.

12. A dry emulsion according to claim 1, wherein the interstitial filler (OF) is obtained from a more extensive lysis to give protein fragments of which at least ⅔ by mass have at most about 50 amino acids.

13. A dry emulsion according to claim 1, wherein the interstitial filler (IF) comprises sugars or oligomers.

14. A dry emulsion according to claim 1, wherein the interstitial filler (IF) comprises at least one saccharide fraction which is a water-soluble or water-dispersible monosaccharide, glycoside or polysaccharide, this being up to 50% of the mass of the sum of the interstitial filler (IF) and of the emulsifier (E).

15. A dry emulsion according to claim 1, wherein the active substances (AS) used in the food sector are selected from mono-, di- and triglycerides, essential oils, colorings, food flavorings, oleoresins, extracts, or edible oils.

16. A dry emulsion according to claim 1, wherein the mass ratio, on a dry basis, between the active substance (AS) and the sum of the active substance (AS), the interstitial filler (IF) and the emulsifier (E) is at least equal to about 0.2.

17. A dry emulsion according to claim 16, wherein the mass ratio, on a dry basis, between the active substance (AS) and the sum of the active substance (AS), the interstitial filler (IF) and the emulsifier (E) is at least equal to about 0.9.

18. A process for the preparation of a dry emulsion as defined in claim 1, comprising the steps of:

a) preparing a dispersion in water or in an aqueous phase comprising at least one hydrophobic active substance (AS), at least one emulsifier (E) and at least one filler (IF); and b) drying said dispersion until a dry emulsion is formed.

19. An emulsified sauce comprising a dry emulsion as defined in claim 1.

20. An emulsified sauce according to claim 19, wherein said sauce is a béarnaise, choron, maltaise, hollandaise, beurre blanc or beurre rouge.

21. A brioche or a fougasse comprising a dry emulsion as defined in claim 1.

* * * * *